(12) United States Patent
Leppänen et al.

(10) Patent No.: US 10,665,027 B2
(45) Date of Patent: May 26, 2020

(54) APPARATUS AND ASSOCIATED METHODS

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy., Espoo (FI)

( * ) Notice: Subject to any disclaimer, the term of this patent is extended or adjusted under 35 U.S.C. 154(b) by 42 days.

(21) Appl. No.: 16/076,631

(22) PCT Filed: Feb. 6, 2017

(86) PCT No.: PCT/FI2017/050063
§ 371 (c)(1),
(2) Date: Aug. 8, 2018

(87) PCT Pub. No.: WO2017/137659
PCT Pub. Date: Aug. 17, 2017

(65) Prior Publication Data
US 2019/0051055 A1    Feb. 14, 2019

(30) Foreign Application Priority Data
Feb. 10, 2016 (EP) ..................... 16155021

(51) Int. Cl.
*G06T 19/00*        (2011.01)
*G06F 3/01*         (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC ... G06T 19/006; G06T 3/0062; G02B 27/017; G02B 2027/0138; G06F 3/011; G06F 3/012; G06F 3/017; G06K 9/0067
See application file for complete search history.

(56) References Cited

U.S. PATENT DOCUMENTS

2010/0313156 A1   12/2010   Louch et al.
2012/0086631 A1    4/2012   Osman et al.
(Continued)

FOREIGN PATENT DOCUMENTS

EP      3112986 A1     1/2017
JP    2013012181 A     1/2013
(Continued)

OTHER PUBLICATIONS

Office Action received for corresponding European Patent Application No. 16155021.5, dated Jul. 24, 2018, 9 pages.
(Continued)

*Primary Examiner* — Michelle L Sams
(74) *Attorney, Agent, or Firm* — Alston & Bird LLP (57) ABSTRACT

An apparatus comprising: at least one processor; and at least one memory including computer program code, the at least one memory and the computer program code configured to, with the at least one processor, cause the apparatus to perform at least the following: based on a virtual reality space provided for viewing by a first user and a physical location of the first user, provide for display of an augmented reality graphic for viewing by a second, different user, in an augmented reality view, said augmented reality graphic comprising an image of at least part of the virtual reality space provided to the first user which is displayed at a position corresponding to the physical location of the first user to at least partially surround the first user in the augmented reality view, such that the second user can see the
(Continued)

at least part of the virtual reality space experienced by the first user.

20 Claims, 7 Drawing Sheets

(51) Int. Cl.
| | |
|---|---|
| *H04N 7/18* | (2006.01) |
| *G06F 3/14* | (2006.01) |
| *G09G 3/00* | (2006.01) |
| *G06F 3/147* | (2006.01) |
| *G06K 9/00* | (2006.01) |
| *G02B 27/01* | (2006.01) |
| *G06T 3/00* | (2006.01) |
| *G06T 19/20* | (2011.01) |

(52) U.S. Cl.
CPC .............. *G06F 3/012* (2013.01); *G06F 3/147* (2013.01); *G06F 3/1423* (2013.01); *G06K 9/00671* (2013.01); *G06T 3/0062* (2013.01); *G09G 3/001* (2013.01); *G09G 3/003* (2013.01); *H04N 7/181* (2013.01); *G02B 27/017* (2013.01); *G02B 2027/014* (2013.01); *G02B 2027/0138* (2013.01); *G06T 19/20* (2013.01); *G09G 2370/16* (2013.01)

(56) References Cited

U.S. PATENT DOCUMENTS

| | | | |
|---|---|---|---|
| 2012/0127284 A1* | 5/2012 | Bar-Zeev | G02B 27/017 348/53 |
| 2012/0249416 A1 | 10/2012 | Maciocci et al. | |
| 2012/0306933 A1* | 12/2012 | Osako | A63F 13/26 345/672 |
| 2013/0050260 A1 | 2/2013 | Reitan | |
| 2013/0083173 A1 | 4/2013 | Geisner et al. | |
| 2013/0141419 A1 | 6/2013 | Mount et al. | |
| 2013/0201214 A1 | 8/2013 | Piippo et al. | |
| 2015/0049002 A1 | 2/2015 | Ishikawa et al. | |

FOREIGN PATENT DOCUMENTS

| | | |
|---|---|---|
| JP | 2013545510 A | 12/2013 |
| WO | 2015/080773 A1 | 6/2015 |
| WO | 2015/192117 A1 | 12/2015 |

OTHER PUBLICATIONS

Office Action received for corresponding European Patent Application No. 16155021.5, dated Dec. 5, 2018, 8 pages.
Office Action received for corresponding European Patent Application No. 16155021.5, dated May 22, 2019, 8 pages.
Office Action received for corresponding European Patent Application No. 16155021.5, dated Jun. 13, 2019, 5 pages.
Extended European Search Report received for corresponding European Patent Application No. 16155021.5, dated Jun. 27, 2016, 8 pages.
International Search Report and Written Opinion received for corresponding Patent Cooperation Treaty Application No. PCT/FI2017/050063, dated Mar. 24, 2017, 13 pages.
Office action received for corresponding Japanese Patent Application No. 2018-540710, dated Sep. 13, 2019, 4 pages of office action and 4 pages of office action translation available.
"Oculus Rift Lets You See What it Would Be Like to Swap Genders (NSFW)" [online] retrieved from the Internet:<https://www.youtube.com/watch?v=ydzwxMhW5yk.com> (2014) [retrieved Nov. 12, 2019].

* cited by examiner

APPARATUS AND ASSOCIATED METHODS

RELATED APPLICATION

This application was originally filed as Patent Cooperation Treaty Application No. PCT/FI2017/050063 filed Feb. 6, 2017 which claims priority benefit to EP Patent Application No. 16155021.5, filed Feb. 10, 2016.

TECHNICAL FIELD

The present disclosure relates to the field of augmented reality and, in particular, to the viewing and control of content presented by a virtual reality apparatus using an augmented reality apparatus. Associated methods, computer programs and apparatus is also disclosed. Certain disclosed aspects/examples relate to portable electronic devices, in particular, virtual reality headsets/glasses, augmented reality glasses (binocular or monocular), so-called hand-portable electronic devices which may be hand-held in use (although they may be placed in a cradle in use). Such hand-portable electronic devices include so-called Personal Digital Assistants (PDAs), mobile telephones, smartphones and other smart devices, smartwatches and tablet PCs.

The portable electronic devices/apparatus according to one or more disclosed aspects/embodiments may provide one or more audio/text/video/data communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

Virtual reality may use a headset, such as glasses or goggles, or one or more displays that surround a user to provide the user with an immersive virtual experience. A virtual reality apparatus may present multimedia content representative of a virtual reality space to a user to simulate the user being present within the virtual reality space. The virtual reality space may be provided by a panoramic video, such as a video having a wide or 360° field of view (or more, such as above and/or below a horizontally oriented field of view). Augmented reality may also use a headset, such as glasses or goggles or a virtual retinal display, to augment a view of the real world as seen through the headset with computer generated content. Thus, a user of augmented reality may be able to view the real world environment around them, which is augmented or supplemented with content provided by an augmented reality apparatus, which may be overlaid on their view of the real world.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising at least one processor and at least one memory including computer program code, the at least one memory and the computer program code configured to, with the at least one processor, cause the apparatus to perform at least the following:

based on a virtual reality space provided for viewing by a first user and a physical location of the first user, provide for display of an augmented reality graphic for viewing by a second, different user, in an augmented reality view, said augmented reality graphic comprising an image of at least part of the virtual reality space provided to the first user which is displayed at a position corresponding to the physical location of the first user to at least partially surround the first user in the augmented reality view, such that the second user can see the at least part of the virtual reality space experienced by the first user.

The provision of an augmented reality graphic in an augmented reality view that shows the virtual reality space viewed by a different user and surrounds said user may be advantageous in providing an intuitive user interface.

Optionally, the augmented reality graphic comprises one or more of;
a cylindrical projection of at least part of the virtual reality space;
a representation of the virtual reality space as viewed from a current location of the first user in the virtual reality space;
a representation of the virtual reality space as viewed at a current time in the virtual reality space;
a panorama of the virtual reality space;
at least a 180° panorama of the virtual reality space;
a substantially 360° panorama of the virtual reality space; and
a semi-transparent augmented reality graphic.

Thus, the apparatus may receive signalling from a virtual reality apparatus indicative of what is provided for viewing by the first user such that signalling can be provided to an augmented reality apparatus for rendering of an appropriate augmented reality graphic.

Optionally, a second augmented reality graphic is provided for augmented reality display to the second user and for selection by the second user, the second augmented reality graphic comprising an image of at least part of a second virtual reality space not currently viewed by the first user for providing to first user on user selection.

The second augmented reality graphic may have one or more of the above features in common with the augmented reality graphic. The second augmented reality graphic may be displayed in the augmented reality view as a strip, for example shaped to surround the first user in the augmented reality view.

Optionally, the second augmented reality graphic is provided for display positioned at the physical location of the first user in the augmented reality view and spaced from the augmented reality graphic, the second augmented reality graphic displayed to at least partially surround an axis extending from the first user in the augmented reality view. The augmented reality graphic and the second augmented reality graphic may be displayed as a stack extending substantially upward from the first user, as viewed by the second user.

Optionally, on selection of the second augmented reality graphic by the second user, provide for virtual reality display of the second virtual reality space associated therewith to the first user.

Optionally, selection of the second augmented reality graphic comprises a free space user gesture of the second user or an input provided via a user interface. Selection of the second augmented reality graphic may comprise providing signalling to the apparatus via a smart phone, computer, touch interface or free space user gesture.

Optionally, the second augmented reality graphic is provided for display above the augmented reality graphic in the augmented reality view and the selection of the second augmented reality graphic or the second virtual reality space associated with it includes providing feedback by moving the second augmented reality graphic to a position surrounding the first user in the augmented reality view.

Optionally, the apparatus provides for user rejection of the second augmented reality graphic, such that virtual reality display of the second virtual reality space associated with the second augmented reality graphic is not provided to the first user. User rejection may include rejection of a candidate augmented reality graphic from a plurality of candidate augmented reality graphics, each candidate augmented reality graphic representing a candidate virtual reality space for possible display to the first user.

Optionally, on the user rejection a further candidate augmented reality graphic representative of a further virtual reality space is provided for selection and display in the augmented reality view in place of the rejected second augmented reality graphic. Thus, if the candidate augmented reality graphics are presented as a stack, the stack or remaining augmented reality graphics thereof may be repositioned on user rejection.

Optionally, the second augmented reality graphic is provided for display above the augmented reality graphic in the augmented reality view and the user rejection of the second augmented reality graphic or the second virtual reality space associated with it includes providing feedback by moving the second augmented reality graphic to a position sideward or upward from the first user in the augmented reality view. The feedback may be provided after a user rejection input has been received or during a free space user gesture that is indicative of user rejection, such as a swipe.

Optionally, a further augmented reality graphic is provided for display to the second user and for selection by the second user, the further augmented reality graphic comprising an image view of at least part of a further virtual reality space not currently viewed by the first user for providing to first user on user selection. A plurality of further augmented reality graphics may be provided.

Optionally, at least the second augmented reality graphic is manipulatable by the second user, in the augmented reality view, such that in response to a rotation input of the second user, the second augmented reality graphic is rotated and wherein on selection of the second augmented reality graphic by the second user, the second virtual reality space associated with the second augmented reality graphic is provided for virtual reality display to the first user with an initial field of view based on the rotation input of the second user. Optionally, each further augmented reality graphic is manipulatable as provided for in relation to the second augmented reality graphic. Optionally, at least the second augmented reality graphic is manipulatable by the second user, in the augmented reality view, such that in response to a translation input of the second user, the virtual position in the second virtual reality space represented by the second augmented reality graphic is changed and wherein on selection of the second augmented reality graphic by the second user, the second virtual reality space associated with the second augmented reality graphic is provided for virtual reality display to the first user with an initial point of view based on the translational input of the second user.

Optionally, the apparatus is one or more of: a smart phone, a computer, a laptop, a head mounted augmented reality apparatus, an eye mounted augmented reality apparatus, a retinal projector based augmented reality apparatus and an intra ocular augmented reality apparatus or a module/circuitry for one or more of the same or a system comprising a combination of augmented reality apparatus and virtual reality apparatus.

Optionally, the augmented reality view comprises a simulated augmented reality view in virtual reality comprising camera imagery of the surrounding real world. Accordingly, the augmented reality graphic may be overlaid onto the camera imagery of the surrounding real world.

In a further aspect there is provided a method, the method comprising:
based on a virtual reality space provided for viewing by a first user and a physical location of the first user, providing for display of an augmented reality graphic for viewing by a second, different user, in an augmented reality view, said augmented reality graphic comprising an image of at least part of the virtual reality space provided to the first user which is displayed at a position corresponding to the physical location of the first user to at least partially surround the first user in the augmented reality view, such that the second user can see the at least part of the virtual reality space experienced by the first user.

In a further aspect there is provided a computer readable medium comprising computer program code stored thereon, the computer readable medium and computer program code being configured to, when run on at least one processor, perform at least the following:
based on a virtual reality space provided for viewing by a first user and a physical location of the first user, provide for display of an augmented reality graphic for viewing by a second, different user, in an augmented reality view, said augmented reality graphic comprising an image of at least part of the virtual reality space provided to the first user which is displayed at a position corresponding to the physical location of the first user to at least partially surround the first user in the augmented reality view, such that the second user can see the at least part of the virtual reality space experienced by the first user.

In a further aspect there is provided an apparatus, the apparatus comprising means configured to, based on a virtual reality space provided for viewing by a first user and a physical location of the first user, provide for display of an augmented reality graphic for viewing by a second, different user, in an augmented reality view, said augmented reality graphic comprising an image of at least part of the virtual reality space provided to the first user which is displayed at a position corresponding to the physical location of the first user to at least partially surround the first user in the augmented reality view, such that the second user can see the at least part of the virtual reality space experienced by the first user.

The present disclosure includes one or more corresponding aspects, examples or features in isolation or in various combinations whether or not specifically stated (including claimed) in that combination or in isolation. Corresponding means and corresponding functional units (e.g., function enabler, object creator, display renderer, user input receiver) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Virtual reality may use a headset, such as glasses or goggles, or one or more displays that surround a user to provide a user with an immersive virtual experience. A virtual reality apparatus may present multimedia content representative of a virtual reality space or world to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (or more, such as above and/or below a horizontally oriented field of view). The virtual reality apparatus may provide for the user to explore, such as by virtually moving around, the virtual reality space and may provide for user interaction with virtual objects in the virtual reality space. Thus, the content provided to the user may be artificial or imaginary and created in a computer or may comprise live or recorded images of the real world, captured by a panoramic video capture device or telepresence device, for example. An example of a presence capture device is a Nokia OZO by Nokia Technologies Oy. The virtual reality space may comprise two dimensional content or virtual three dimensional content, such as by way of stereoscopic display. The virtual reality space may provide for a 360° field of view and may provide for panning around said field of view based on movement of the user's head or eyes. The view of a virtual reality user may be provided to said user by virtual reality apparatus via displays in the headset.

Augmented reality may also use a headset, such as glasses or goggles or virtual retinal display, to augment a view of the real world as seen through the headset with computer generated content. Thus, a user of augmented reality may be able to view the real world environment around them, which is augmented or supplemented with content provided by an augmented reality apparatus, which may be overlaid on their view of the real world. The content may comprise multimedia content such as pictures, photographs, video, diagrams, textual information, aural content among others. Thus, while augmented reality may provide for direct viewing of the real world with the addition of computer generated graphics and content, a user of virtual reality may only be able to see content presented on displays of the virtual reality apparatus substantially without direct viewing of the real world.

It has been realised that augmented reality may provide a convenient way of controlling the virtual reality content viewed by others. Thus, a first user may use a virtual reality apparatus to view virtual reality content of a virtual reality space. A second user, who can physically see the first user in the real world, may use the augmented reality apparatus to view and control the virtual reality content viewed by the first user. This is advantageous as the use of augmented reality to control the virtual reality experience of another user or users may be intuitive and efficient.

Figure 1:
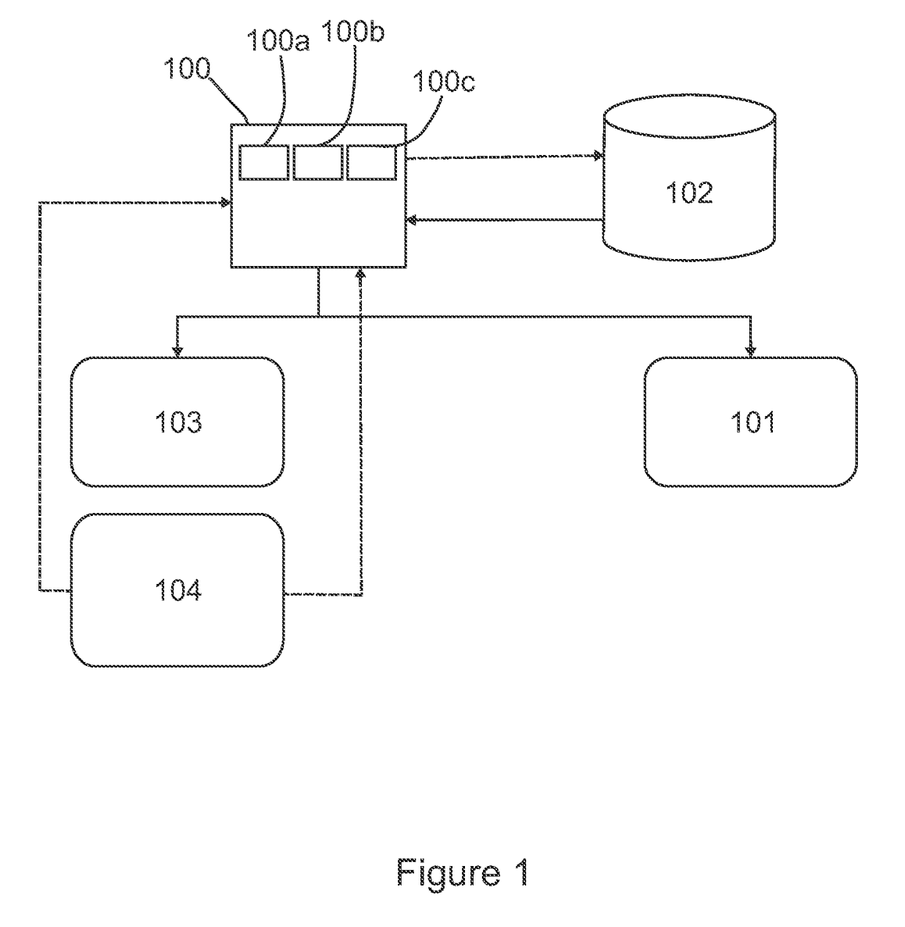
FIG. 1 illustrates an example apparatus embodiment as part of a system comprising a number of electronic components, including a server, content storage, virtual reality glasses and augmented reality glasses, according to one embodiment of the present disclosure.

FIG. 1 shows an apparatus 100 configured to provide for control of a virtual reality apparatus using an augmented reality apparatus. In this example, the apparatus is provided by a computer server 100, which may comprise a memory and a processor. The server 100, in this example, provides at least part of the functionality of the virtual reality apparatus in combination with virtual reality (VR) glasses 101 and a virtual reality content store 102. The server 100, in this example, provides at least part of the functionality of the augmented reality apparatus in combination with augmented reality (AR) glasses 103 and a motion tracker 104.

Thus, in this example, one apparatus, the server 100, provides the functionality of the virtual reality (VR) apparatus, the augmented reality (AR) apparatus and the apparatus for controlling the virtual reality apparatus using the augmented reality apparatus, although they have been shown functionally separate in FIG. 1 as 100a, 100b and 100c respectively. However, it will be appreciated these apparatuses may be physically separate or grouped together differently.

In this embodiment the server 100 or each apparatus 100a, 100b, 100c mentioned above may have only one processor and one memory but it will be appreciated that other embodiments may utilise more than one processor and/or more than one memory (e.g. same or different processor/memory types). Further, the apparatus(es) 100a, 100b, 100c may be an Application Specific Integrated Circuit (ASIC).

The processor may be a general purpose processor dedicated to executing/processing information received from other components, such as content store 102 and motion tracker 104 in accordance with instructions stored in the form of computer program code on the memory. The output signalling generated by such operations of the processor is provided onwards to further components, such as 101, 103 and 102.

The memory (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor and memory are all electrically connected to one another internally to allow for electrical communication between the respective components. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
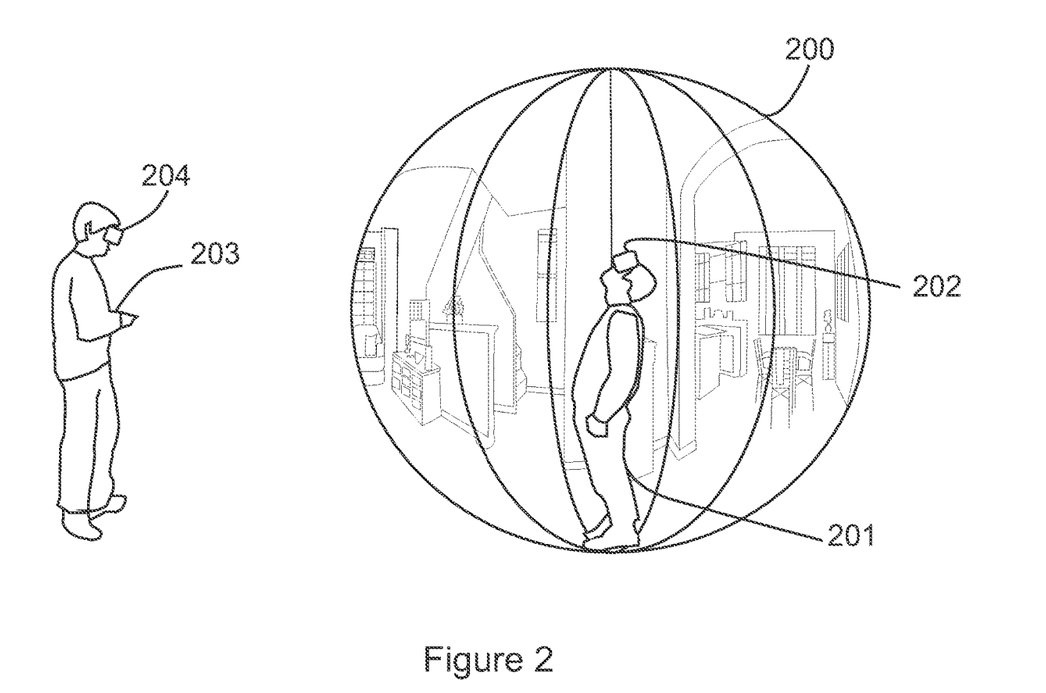
FIG. 2 illustrates an example virtual reality view.

FIG. 2 shows a schematic representation of a virtual reality space 200 as currently viewed by a first user 201 who is wearing a virtual reality headset 202. The virtual reality space is shown as a sphere surrounding the first user 201 to represent the immersive nature of virtual reality in that all that the first user can see through the headset 202 is provided by the virtual reality apparatus 100a. The virtual reality space 200 may be considered to comprise a digital space or world that is generated from multimedia content, such as from the content store 102, for display to the first user 201.

The first user 201 may virtually explore, i.e. virtually move around, the virtual reality space 200. The first user 201 may virtually move around using a controller (not shown) or by physical movement that is detected by the virtual reality apparatus 100a or a component thereof. Further, the virtual reality head set 202 may include orientation or movement sensors, such as accelerometers, so that when the first user moves their head, the virtual reality view provided by the VR apparatus 100a is moved accordingly.

Thus, the first user 201 may be provided with a virtual reality view of the virtual reality space 200 based on one or more of their virtual location in the virtual reality space 200 and the direction in which the first user is looking (such as derived from the physical orientation of the headset 202).

A second user 203 is shown wearing an augmented reality headset 204. The augmented reality headset is provided with one or more augmented reality graphics from the augmented reality apparatus 100b to overlay onto the view of the real world seen by the second user 203. The second user 203 can physically see the first user 201 through the augmented reality headset 204. Thus, the augmented reality headset 204 differs from the virtual reality headset 202 in that the augmented reality headset 204 allows the second user 204 to see, directly, the real world around them while first user 201 can only see what is provided via displays in the virtual reality headset 202. It will be appreciated that the second user 203 does not see the virtual reality space 200 (the sphere) as the sphere is representative of what the first user 201 is viewing. In one or more other examples, the second user 203 uses a virtual reality headset configured to show a view (such as from a camera associated with the virtual reality headset) of the real world around the second user via one or more displays of the virtual reality headset along with the augmented reality graphics. Thus, it will be appreciated that in this example, a virtual reality headset is being used to "simulate" an augmented reality headset. Nevertheless, the augmented reality graphics may be overlaid onto the camera imagery of the real world similar to when using the augmented reality headset. Accordingly the apparatus may be considered to provide for display of an augmented reality graphic (in virtual reality) for viewing by the second, different user, in a virtual reality view of the real world surrounding the user.

The augmented reality head set 204 cooperates with the motion tracker 104 and the AR apparatus 100b to provide the augmented reality functionality. In summary, the augmented reality apparatus 100b may need to appreciate where (or in some examples at what) the second user 203 is looking so that the augmented reality graphics can be overlaid in the second user's view at the desired position. The motion tracker 104 may functionally provide signalling representative of the positions of the first and/or second users 201,203 and/or where the first user is looking, which may be derived from various sensors. The augmented reality apparatus 100b may include image detection and object recognition functionality in order to automatically recognise the first user 201, for example.

Figure 3:
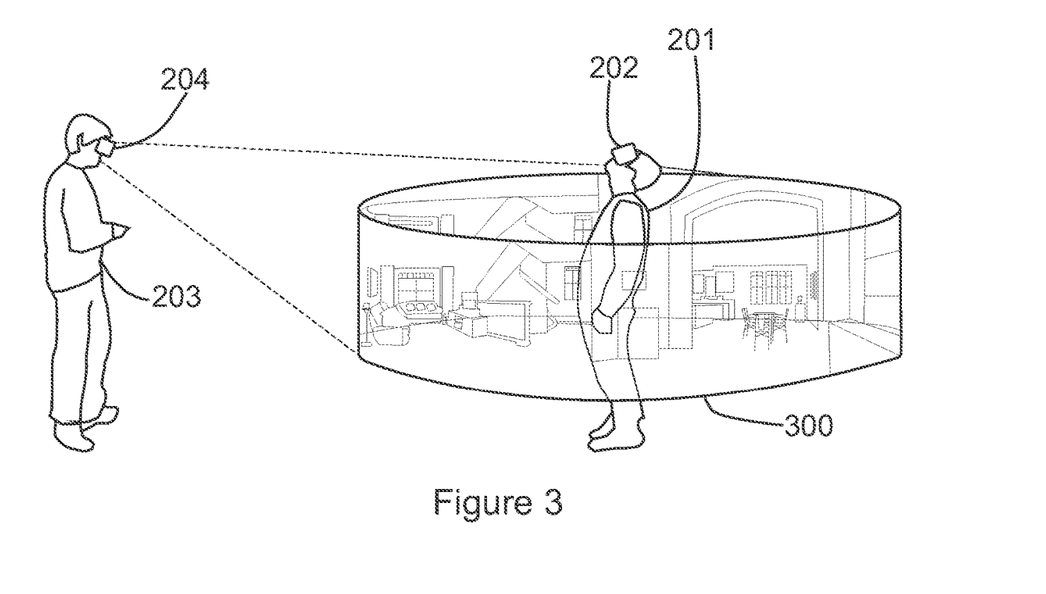
FIG. 3 illustrates an example augmented reality view.

FIG. 3 shows a representation of the augmented reality view of the second user 203. The AR view comprises the first user 201, as viewed in the real world, and an augmented reality graphic 300. The augmented reality graphic 300 is displayed such that it is associated with the physical location of the first user 201. The augmented reality graphic 300 comprises a representation of said virtual reality space 200 currently experienced by the first user 201. The graphic 300 comprises an image, still or moving, of at least part of the virtual reality space 200.

The augmented reality graphic 300 is displayed to at least partially surround the first user 201 and is positioned, in the augmented reality view, at the physical location of the first user 201 such that the second user 203 can see at least part of the virtual reality space 200 experienced by the first user 201. It will be appreciated that while FIG. 3 diagrammatically shows the augmented reality view not from the point of view of the second user, this is for explanatory purposes and the view of the first user 201 and the augmented reality graphic 300 will be presented to the second user 203 through the augmented reality head set 204.

In this example, the augmented reality graphic 300 comprises a cylindrical strip. The cylindrical strip may include a cylindrical projection of at least part of the virtual reality space 200, such as a panorama of the virtual reality space 200. The augmented reality graphic 300 may be position such that it substantially surrounds the first user showing the 360 degree view in the virtual reality space. Thus, the augmented reality graphic shows a 360 degree panorama of the virtual reality space 200. In this example, the strip is horizontally oriented. Further, the strip has a width that appears less than the physical height of the first user 201 so as not to obscure them to the second user 203 in the augmented reality view. The augmented reality graphic 300 may be semi-transparent so that the second user 203 can see the first user through the augmented reality graphic 300.

In other examples, the augmented reality graphic 300 is positioned such that it is associated with the first user 201 but may not necessarily completely surround the first user 201. For example, the augmented reality graphic may be rendered to curve around the first user 201, but may extend at least 90°, at least 120°, at least 180° or at least 270° around them. A width of the augmented reality graphic 300 may be based on the field of view of the first user in the virtual reality space 200. In one example markers, displayed as part of or in addition to the augmented reality graphic may show the first user's current field of view within the image shown by the graphic. While in this example a curving (e.g. circular) projection of a panorama of the virtual reality space 300 is shown as the augmented reality graphic 300, the graphic 300 may comprise a strip of other cross-section, such as square, rectangular, pentagonal, hexagonal or so on. The separation of the augmented reality graphic 300 from the first user 201 in the AR view may be a predetermined separation or may be related to the proximity of the first user 201 (or the "camera" location in the VR space) to a virtual object or a virtual scene viewed by the first user 201 in the virtual reality space 200. Providing the augmented reality graphic 300 to at least partially wrap around the first user and present a panorama of the virtual reality space is advantageous as it provides the second user 203 with an intuitive and effective appreciation of what the first user is experiencing.

The augmented reality graphic 300 may comprise a representation of the virtual reality space 200 as currently viewed by the first user 201. Thus, as the first user 201 virtually moves around the virtual reality space 200 their virtual location changes and therefore so does their point of view. Accordingly, the augmented reality graphic 300 may show a representation of the virtual reality space at the virtual location of the first user 201. In other examples the augmented reality graphic shows the virtual reality space at a predetermined or fixed virtual location. The representation of the virtual reality space 200 as currently viewed by the first user 201 may comprise the current time in the virtual reality space. For example, if the virtual reality space is provided by a panoramic video, an image or images from the panoramic video at the current time point in the panoramic video (as viewed by the first user 201) may be provided for use as the augmented reality graphic 300. If the virtual reality space is provided by a computer generated VR world that changes over time, the AR graphic 300 may be based on images of the VR space at the current time point in the VR space. Thus, the augmented reality graphic 300 may be actively updated in real time, intermittently or periodically with the current (in terms of virtual location and/or virtual time) view of the first user 201 in the virtual reality space 200.

Accordingly, the apparatus 100c may receive signalling from the VR apparatus 100a representative of images of what the first user 201 is currently viewing in the virtual reality space 200. The apparatus 100c may render the received images or provide signalling for the AR apparatus 100b to render the images as an augmented reality graphic 300 for display to the second user 203. The apparatus 100c may provide signalling to the augmented reality apparatus 100b to identify the location of the first user 201 so that the augmented reality graphic 300 can be displayed in the correct location, i.e. surrounding the first user 201 from the point of view of the second user 203.

Figure 4:
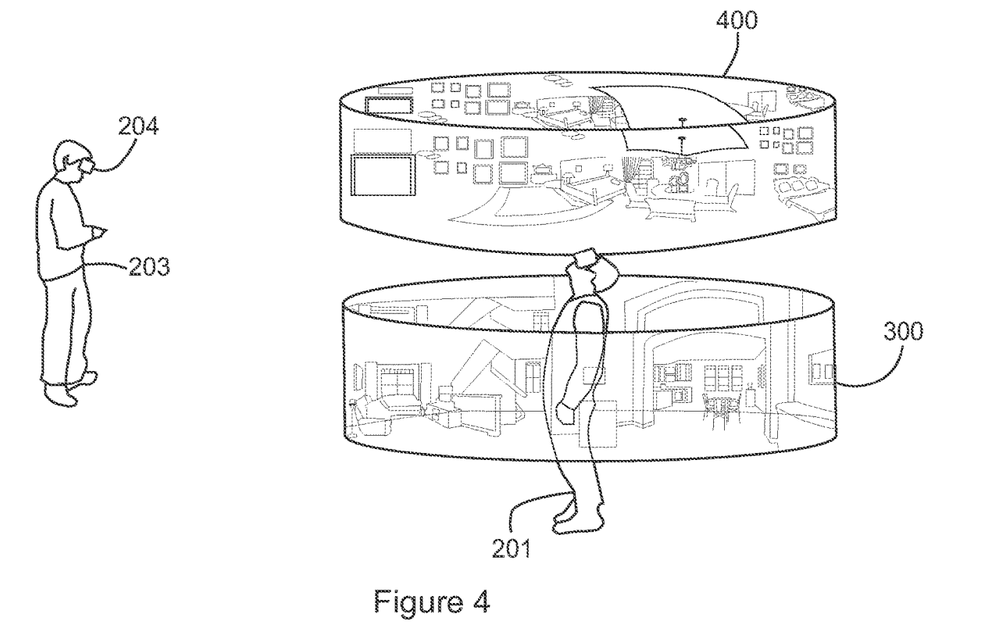
FIG. 4 illustrates an example augmented reality view showing current and possible virtual reality spaces for viewing in virtual reality.

FIG. 4 shows an explanatory diagram of the augmented reality view of the second user 203. The view is similar to that shown and described above in relation to FIG. 3 except that a second augmented reality graphic 400 is shown. The augmented reality graphic 300, as before, comprises a representation of the virtual reality space currently viewed by the first user 201. The second augmented reality graphic 400 comprises a representation of a different, second virtual reality space not currently visible to the first user 201 through the VR headset 202. Thus, the second user 204 may view representations of another virtual reality space(s) that can be provided to the first user 201 in the virtual reality view.

The second augmented reality graphic 400, in this example, is similar in form to the augmented reality graphic 300. In particular, it comprises a 360° panorama of the second augmented reality space rendered as a substantially cylindrical strip. The second augmented reality graphic 400 is, in this example, position above and spaced from the augmented reality graphic 300, although different positions are possible. The second augmented reality graphic 400 is, in this example, vertically aligned with the augmented reality graphic 300 and thus also the first user 201. While the second augmented reality graphic does not at least partially surround the first user it may surround a position directly above the first user 201.

The apparatus 100c may, such as on user input from the second user 203, present possible or "candidate" virtual reality spaces from the content store 102, as second or further augmented reality graphics for selection by the second user. On selection of the second augmented reality graphic 400, its associated second virtual reality space may be presented to the first user 201 in their virtual reality view. Thus, the virtual reality view 200 may be replaced with a virtual reality view of the second virtual reality space.

Selection of the second augmented reality graphic 400 may comprise receiving signalling from a user input device, such as smart phone, computer or controller, which is in communication with the apparatus 100c when actuated by the second user 203. Alternatively selection may be provided by signalling that represents a free space user gesture (for example, a mid-air gesture with a user's hand). Thus, the second user 203 may point or otherwise select the second augmented reality graphic 400 and perform a gesture to provide an instruction that the second virtual reality space should be displayed to the first user 201. Accordingly, the AR apparatus 100b or motion tracker 104 may track the position of the second user's hands to detect user gesture input and provide the relevant signalling to the apparatus 100c and VR apparatus 100a.

Figure 5:
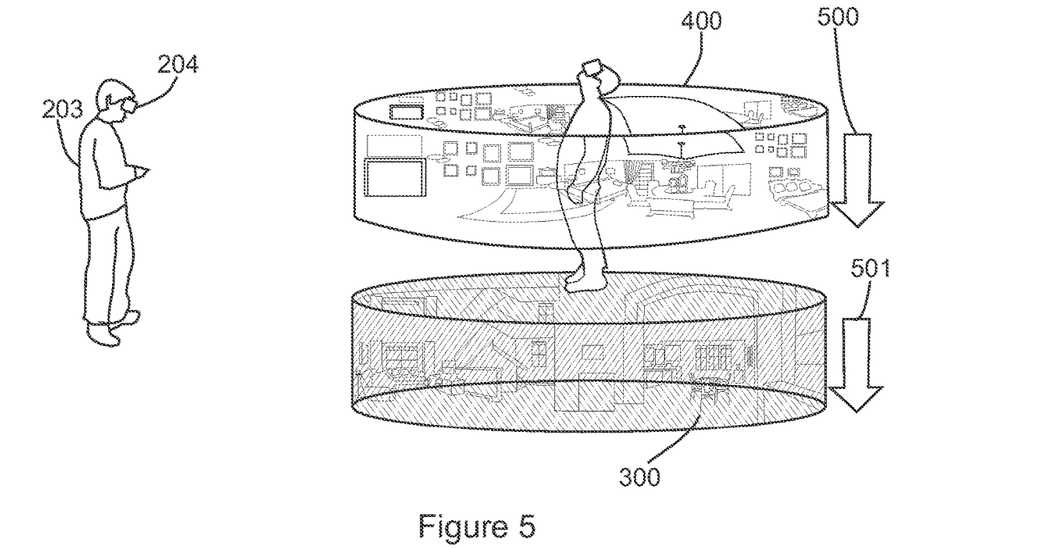
FIG. 5 illustrates an example augmented reality view showing user selection and changing of a current virtual reality view for a candidate virtual reality view.

FIG. 5 shows the second user 203 having selected the second augmented reality graphic 400 in their augmented reality view such that the corresponding virtual reality space is presented to the first user 201 in their virtual reality view. The second virtual reality graphic 400 is shown moved to surround the first user 201 (represented by arrow 500) in order to provide feedback to the second user 203 that the first user 201 is now viewing the second virtual reality space. In this example, the augmented reality graphic 300 is shown in a lower position (movement to the lower position represented by arrow 501) relative to the first user 201 to provide feedback that the first virtual reality space 200 is no longer presented to the first user 201. The augmented reality graphic 300 may subsequently disappear or fade out of the augmented reality view or may disappear/fade out without having been shown in the lower position. It will be appreciated other forms of feedback to show removal of the virtual reality space 200, represented by the augmented reality graphic 300, from the virtual reality view may be provided.

If free space gestures are used to provide the selection of the second augmented reality graphic 400, the first user may "grab" the second augmented reality graphic 400 in the augmented reality view and "move" it downward, into the eye line and/or to surround the first user 201. The action of moving the second augmented reality graphic 400 to surround the first user 201 may thus provide the selection of the second augmented reality graphic. This provides an advantageous intuitive experience for the second user 203. Further, whether or not such gestures are used, the provision of candidate augmented reality graphics representing candidate virtual reality spaces that may move or be moved between hovering positions (i.e. spaced from) around the first user 201 and positions in which the graphic 300, 400 surrounds the first user 201, in order to provide feedback of an action or the making of the selection, may be an advantageous interface.

Figure 6:
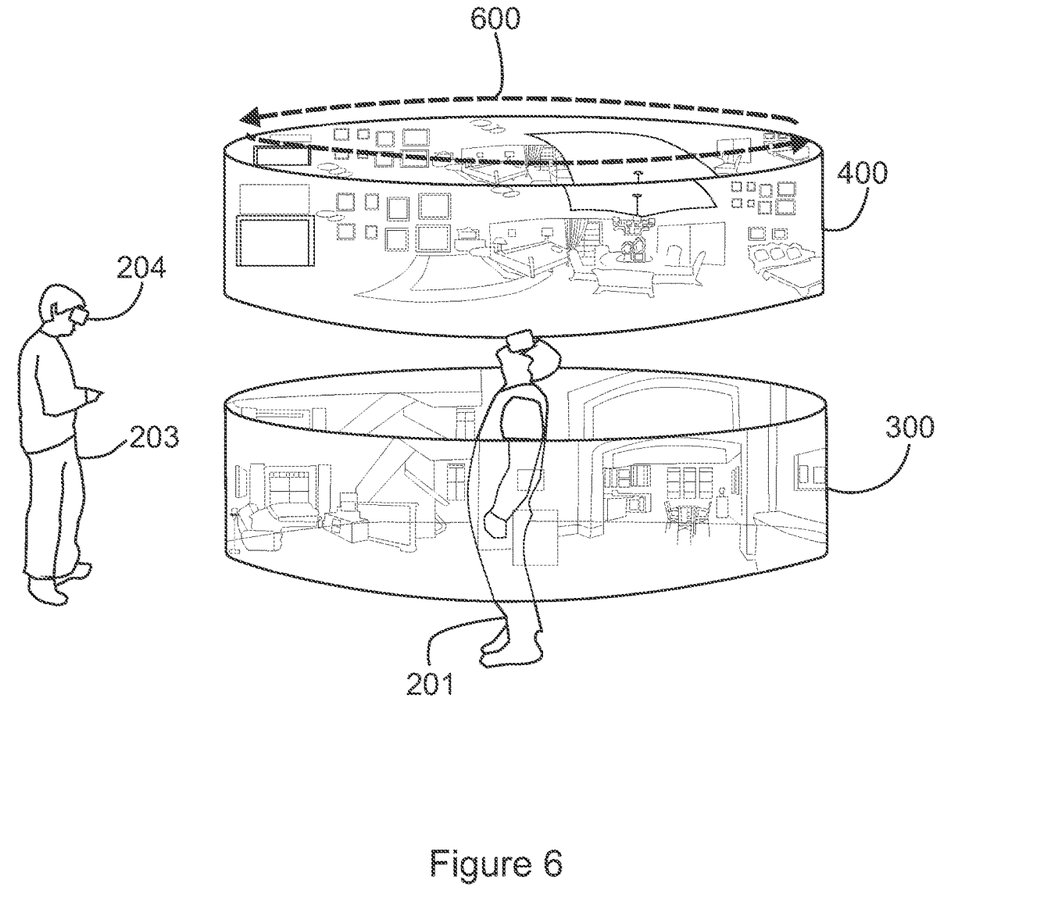
FIG. 6 illustrates an example augmented reality view showing orientation of a possible virtual reality space.

FIG. 6 shows a view similar to that shown in FIG. 4 and shows that the second augmented reality graphic 400 is manipulatable in the augmented reality view, at least in terms of its orientation relative to the first user 201. Arrows 600 shows that on user input by the second user 203, the second augmented reality graphic 400 may be rotated about its axis. Thus, prior to selecting the second augmented reality graphic 400 to provide the corresponding virtual reality space for viewing, the first user 203 can orientate the second augmented reality graphic 400 to control an initial field of view presented to the first user 201 when the corresponding second virtual reality space is presented to them by the VR apparatus 100*a*. This is particularly advantageous as a virtual reality space, such as one comprising a panoramic video, may have a particular focus, such as where particular people or action is located. By providing for control of an initial field of view of a virtual reality space for presentation to the first user 201, using manipulation of such an augmented reality graphic 400, the attention of the first user 201 can be directed to what the second user 203 feels important.

Once the second virtual reality space is presented to the first user 201 in the VR view, manipulation by the second user 203 may not be provided. Thus, once the virtual reality space corresponding to an augmented reality graphic is currently viewable by the first user of the VR apparatus, control of the field of view presented in the VR view is not modifiable by manipulation of the augmented reality graphic in the AR view. This is advantageous, as limiting control of the movement of the VR view to the first user 201 may prevent an unsettling experience for the first user 201.

The initial field of view in the virtual reality space may be determined based on the rotation of the corresponding augmented reality graphic. In particular, the orientation of the augmented reality graphic relative to the orientation of the first user 201 may be used. Thus, the second user 203 may rotate the augmented reality graphic to position the point of interest directly in front of the first user 201 to set the initial field of view (in VR) for the first user 201. Alternatively, the orientation of the augmented reality graphic relative to the second user 203 may be used irrespective of the orientation of the first user 201. Thus, the second user may rotate the augmented reality graphic to position the point of interest to directly face them to set the initial field of view (in VR) for the first user 201.

In other examples, the apparatus 100*c* may provide for manipulation of the second augmented reality graphic 400 by virtual translational movement around the corresponding virtual reality space. Thus, if the corresponding virtual reality space comprises a navigable computer generated world, the second user 203 may be able to change the virtual location (or virtual time) of the initial view in the virtual reality space for display in the VR view to the first user 201. Thus, the initial point of view of the virtual reality space may be a point of view based on the virtual location provided via the AR apparatus or a field of view based on orientation of the augmented reality graphic 400.

In other examples, the augmented reality graphic may be manipulatable to control what is initially viewed in the VR view but is not selectable to change the VR view of the first user 201. For example, the first user 201 or a third party may control the transition between one virtual reality space and another in the VR view.

The apparatus 100*c* may thus be configured to receive user input signalling indicative of rotation of the augmented reality graphic and/or translation around the virtual reality space represented by the augmented reality graphic. Further, the apparatus 100*c* may provide signalling to provide feedback to the second user 203 in the AR view showing the modified augmented reality graphic. The apparatus 100*c* may provide signalling to the VR apparatus 100*a* to indicate the initial field of view/point of view in the virtual reality space to be presented in the VR view when the virtual reality space is initially presented.

Figure 7:
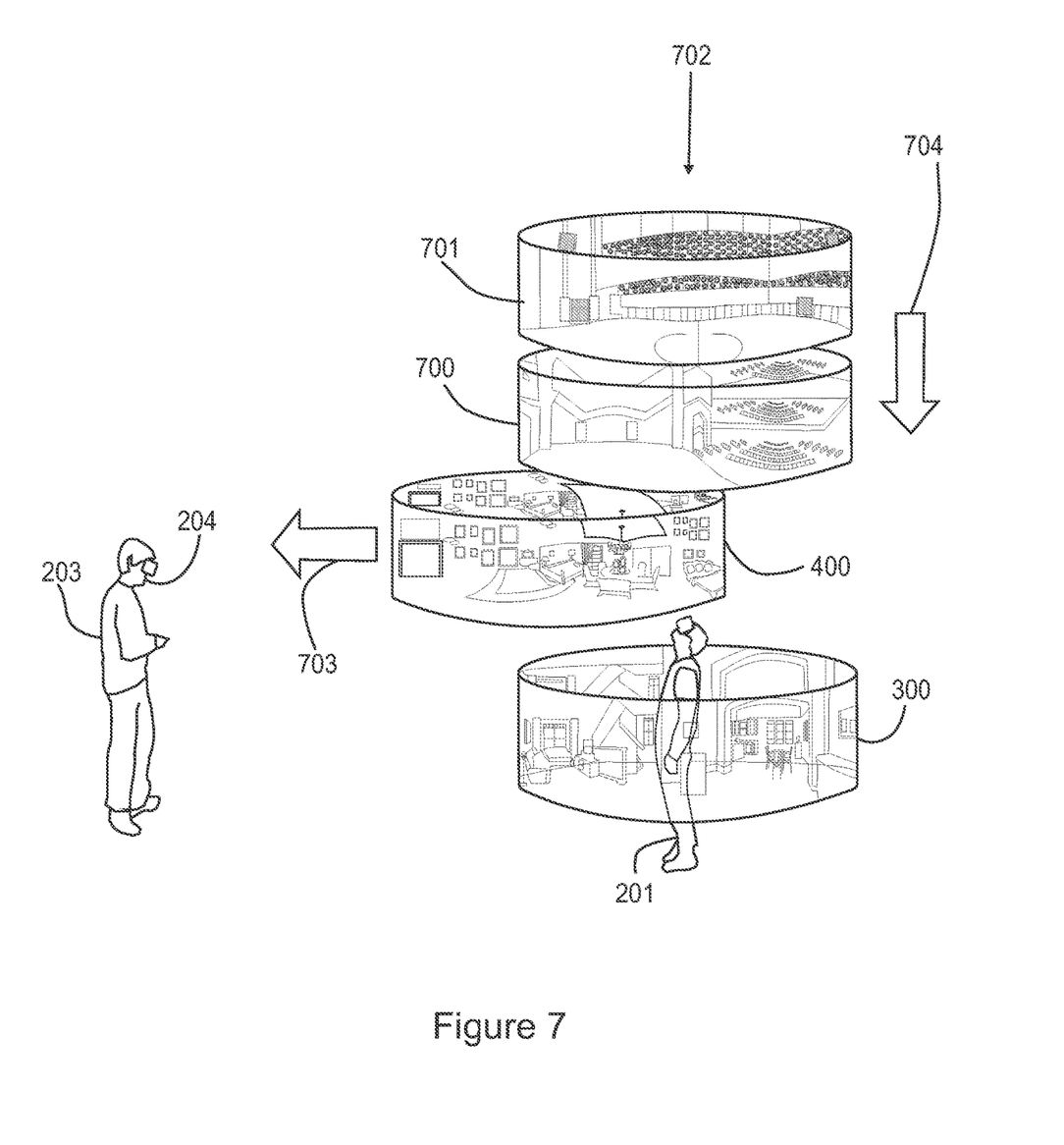
FIG. 7 illustrates an example augmented reality view showing rejection of a possible virtual reality space.

FIG. 7 shows an explanatory diagram of the augmented reality view of the second user 203 and includes a further augmented reality graphic 700. In particular, it includes two further augmented reality graphics 700 and 701. Each of the further augmented reality graphics, like the second augmented reality graphic 400, represent different candidate virtual reality spaces that, on selection, can be presented to the first user 201 in their VR view. It will be appreciated that the description above related to and, in particular, any functionality provided in relation to the second augmented reality graphic 400 can be applied equally to any number of further augmented reality graphics 700, 701.

The apparatus 100*c* may be configured to provide candidate virtual reality spaces, for possible display in the VR view, represented as augmented reality graphics 400, 700, 701 in the augmented reality view. Further, the apparatus 100*c* may provide for rejection of a candidate virtual reality space in response to a user input of the second user 203. User rejection may comprise removing one or more candidate virtual reality spaces from a plurality of candidate virtual reality spaces as represented by augmented reality graphics in the augmented reality view.

As shown in FIG. 7, the plurality of augmented reality graphics 400, 700, 701 are displayed in the augmented reality view as a stack 702. The stack may be substantially centred over the first user. Thus, the stack 702 may be provided in the augmented reality view in association with the first user 201. Further, FIG. 7 shows movement (see arrow 703) of the second augmented reality graphic 400 away from an axis of the stack 702. This provides feedback to the second user 203, in the AR view, that the second virtual reality space represented by the second augmented reality graphic has been rejected from the candidate virtual reality spaces that may be selected. The rejected second virtual reality graphic 400 (or, more generally, a rejected candidate augmented reality graphic) may subsequently disappear from the AR view or fade out. It will be appreciated that this rejection feedback is optional and the rejected candidate augmented reality graphic may be removed from the AR view.

If free space gestures are used to provide the rejection of the second augmented reality graphic 400, the first user may "grab" the second augmented reality graphic 400 in the augmented reality view and "move" it laterally, out of the stack 702. The action of moving the second augmented reality graphic 400 out of the stack may be displayed as feedback of the free space gesture. This provides an advantageous intuitive experience for the second user 203.

Once a rejected candidate augmented reality graphic 400 has been removed, the remaining candidate augmented reality graphic (in this example 700 and 702) are moved downward to take the space of the rejected candidate augmented reality graphic, as shown by arrow 704.

Accordingly the apparatus 100*c* may provide signalling to the AR apparatus 100*b* to change the display of the second/ further augmented reality graphics (in terms of position or visibility) in response to signalling representing user rejection or other gestures.

Figure 8:
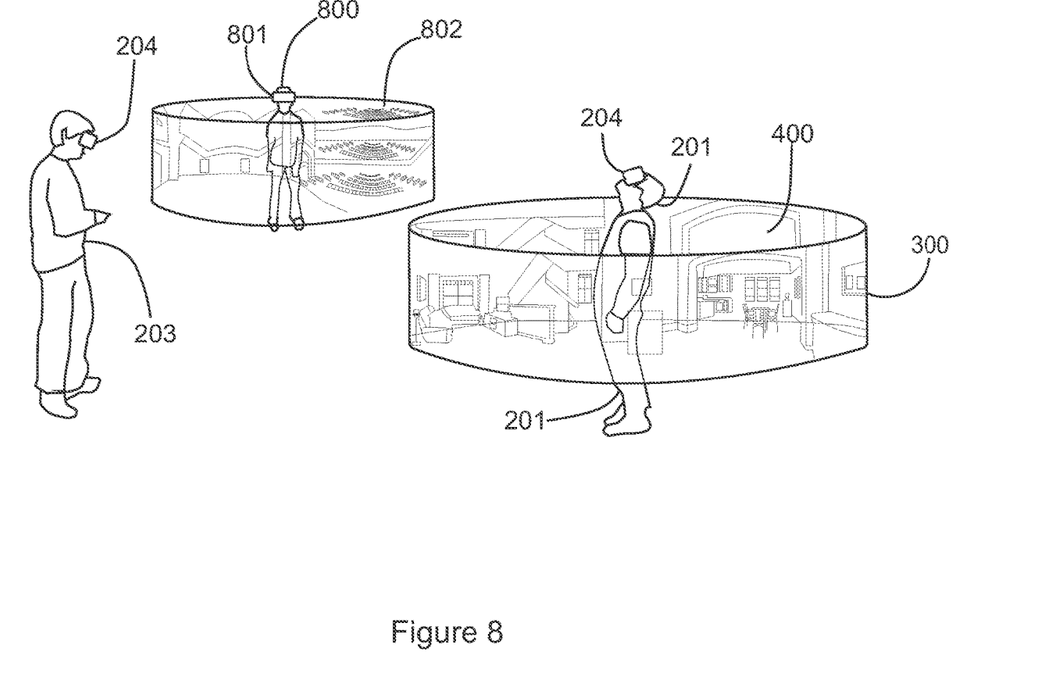
FIG. 8 illustrates an example augmented reality view showing multiple virtual reality users.

FIG. 8 shows a representation of the augmented reality view of the second user 203. In this example, a third user 800 is present. The third user 800 is a user of virtual reality apparatus, similar to the first user 201, and is shown with a virtual reality head set 801. The third user 800 is provided with a virtual reality view of a virtual reality space, which is not necessarily the same virtual reality space as that provided to the first user 201. The second user 203 is able to view an augmented reality graphic 802 that is representative of the virtual reality space the third user 800 is viewing. Similar to the augmented reality graphic 400, the augmented reality graphic 801 is shown to surround the user it is associated with and comprises an image from the associated virtual reality space, such as a 360° panorama. Accordingly, the second user 203 may perform any of the actions or functionality described above for multiple virtual reality users (first user 201 and the third user 800 and any other further VR users). The apparatus 100c may provide for switching between control of the virtual reality experience of the different virtual reality users for the second user 203 in response to second user input or based on who the second user 203 is looking at. Thus, the second user is able to effectively control the "selection", "rejection" and "manipulation" functionality described above for multiple virtual reality users.

Figure 9:
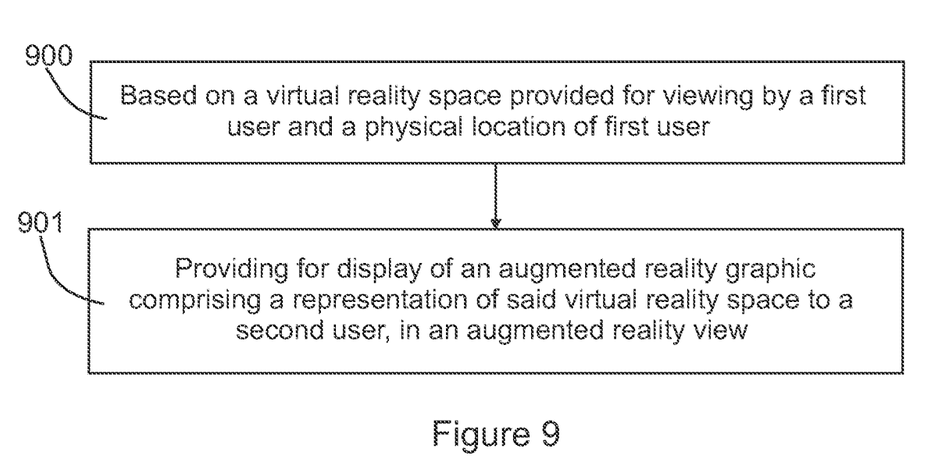
FIG. 9 illustrates a flowchart according to a method of the present disclosure.

FIG. 9 shows a flow diagram illustrating the steps of based on a virtual reality space provided for viewing by a first user and a physical location of the first user 900; providing for display of an augmented reality graphic comprising a representation of said virtual reality space to a second, different user, in an augmented reality view, said augmented reality graphic comprising an image of at least part of the virtual reality space provided to the first user and displayed at a position corresponding to the physical location of the first user and to at least partially surround the first user in the augmented reality view, such that the second user can see the virtual reality space experienced by the first user 901.

Figure 10:
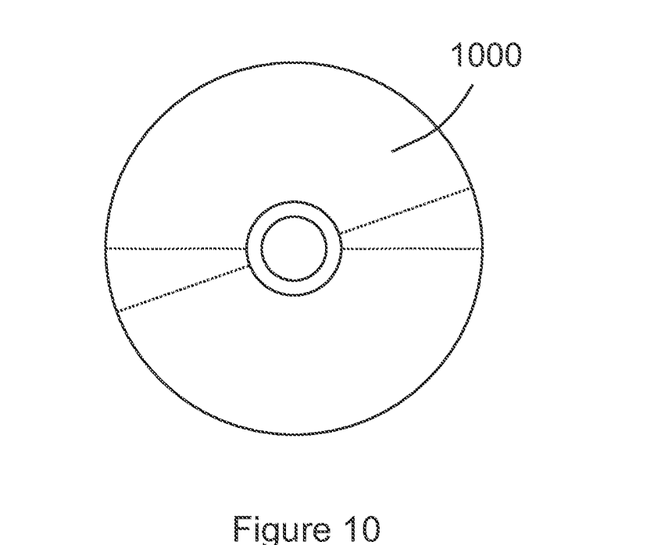
FIG. 10 illustrates schematically a computer readable medium providing a program.

FIG. 10 illustrates schematically a computer/processor readable medium 1000 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a virtual reality apparatus, a wearable apparatus, an augmented reality apparatus or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   based on a virtual reality space, defined by at least an axis extending from a physical location of a first user, and provided for viewing by the first user,
   provide for display of an augmented reality graphic for viewing by a second, different user, the second user positioned outside of the virtual reality space, said augmented reality graphic comprising an image of at least part of the virtual reality space provided to the first user, wherein the augmented reality graphic is displayed such that a perceivable position of the augmented reality graphic by the second user is in the virtual reality space and at least partially surrounds the axis extending from the physical location of the first user, such that the second user can see the at least part of the virtual reality space experienced by the first user.

2. The apparatus of claim 1, wherein the augmented reality graphic comprises one or more of:
   a cylindrical projection of at least part of the virtual reality space;
   a curved projection of at least a 180° view in the virtual reality space; or
   a cylindrical strip showing a cylindrical projection of a 360° view in the virtual reality space.

3. The apparatus of claim 1, wherein a second augmented reality graphic is provided for augmented reality display to the second user and for selection by the second user, the second augmented reality graphic comprising an image of at least part of a second virtual reality space not currently viewed by the first user for providing for display to first user on user selection.

4. The apparatus of claim 3, wherein the second augmented reality graphic is provided for display positioned at the physical location of the first user in the augmented reality view and spaced from the augmented reality graphic, the second augmented reality graphic displayed to at least partially surround an axis extending from the first user in the augmented reality view.

5. The apparatus of claim 3, wherein in response to selection of the second augmented reality graphic by the second user, provide for virtual reality display of the second virtual reality space associated therewith to the first user.

6. The apparatus of claim 3, wherein selection of the second augmented reality graphic comprises a free space user gesture of the second user.

7. The apparatus of claim 3, wherein the second augmented reality graphic is provided for display above the augmented reality graphic in the augmented reality view and the selection of the second augmented reality graphic or the second virtual reality space associated therewith causes moving the second augmented reality graphic to a position perceived to surround the first user in the augmented reality view.

8. The apparatus of claim 3, in which a further augmented reality graphic is provided for augmented reality display to the second user and for selection by the second user, the further augmented reality graphic comprising an image view of at least part of a further virtual reality space not currently viewed by the first user for providing for display to first user on user selection.

9. The apparatus of claim 3, wherein at least the second augmented reality graphic is manipulatable by the second user, in the augmented reality view, such that in response to a rotation input of the second user, the second augmented reality graphic is rotated and wherein on selection of the second augmented reality graphic by the second user, the second virtual reality space associated with the second augmented reality graphic is provided for virtual reality display to the first user with an initial field of view based on the rotation input of the second user.

10. The apparatus of claim 3, wherein the apparatus provides for rejection of the second augmented reality graphic based on user input, such that virtual reality display of the second virtual reality space associated with the second augmented reality graphic is not provided to the first user.

11. The apparatus of claim 10, wherein based on the rejection of the second augmented reality graphic based on the user input, a further candidate augmented reality graphic representative of a further virtual reality space is provided for selection and display in the augmented reality view in place of the rejected second augmented reality graphic.

12. The apparatus of claim 10, wherein the second augmented reality graphic is provided for display above the augmented reality graphic in the augmented reality view and the rejection of the second augmented reality graphic or the second virtual reality space associated with it includes providing feedback by moving the second augmented reality graphic to a position sideward or upward from the first user in the augmented reality view.

13. The apparatus of claim 1, wherein the apparatus is one or more of: a head mounted augmented reality apparatus, an eye mounted augmented reality apparatus, a retinal projector based augmented reality apparatus and an intra ocular augmented reality apparatus or a module for one or more of the same or a system comprising a combination of augmented reality apparatus and virtual reality apparatus, and wherein the at least one memory and the computer program code are further configured to, with the at least one processor, cause the apparatus to perform at least the following:

enable the second user to interact with at least the augmented reality graphic to control at least some functionality of the virtual reality space provided to the first user.

14. A method comprising based on a virtual reality space, defined by at least an axis extending from a physical location of a first user, and provided for viewing by the first user, providing for display of an augmented reality graphic for viewing by a second, different user, the second user positioned outside of the virtual reality space, said augmented reality graphic comprising an image of at least part of the virtual reality space provided to the first user, wherein the augmented reality graphic is displayed such that a perceivable position of the augmented reality graphic by the second user is in the virtual reality space and at least partially surrounds the axis extending from the physical location of the first user in the augmented reality view, such that the second user can see the at least part of the virtual reality space experienced by the first user.

15. The method of claim 14, wherein the augmented reality graphic comprises one or more of:

a cylindrical projection of at least part of the virtual reality space;

a curved projection of at least a 180° view in the virtual reality space; or a cylindrical strip showing a cylindrical projection of a 360° view in the virtual reality space.

16. The method of claim 14, wherein a second augmented reality graphic is provided for augmented reality display to the second user and for selection by the second user, the second augmented reality graphic comprising an image of at least part of a second virtual reality space not currently viewed by the first user for providing for display to first user on user selection.

17. The method of claim 16, wherein the second augmented reality graphic is provided for display positioned at the physical location of the first user in the augmented reality view and spaced from the augmented reality graphic, the second augmented reality graphic displayed to at least partially surround an axis extending from the first user in the augmented reality view.

18. The method of claim 16, wherein on selection of the second augmented reality graphic by the second user, provide for virtual reality display of the second virtual reality space associated therewith to the first user.

19. The method of claim 16, wherein selection of the second augmented reality graphic comprises a free space user gesture of the second user.

20. A computer readable medium comprising computer program code stored thereon, the computer readable medium and computer program code being configured to, when run on at least one processor, perform at least the following:

based on a virtual reality space, defined by at least an axis extending from a physical location of a first user, and provided for viewing by the first user, provide for display of an augmented reality graphic for viewing by a second, different user, the second user positioned outside of the virtual reality space, said augmented reality graphic comprising an image of at least part of the virtual reality space provided to the first user, wherein the augmented reality graphic is displayed such that a perceivable position of the augmented reality graphic by the second user is in the virtual reality space and at least partially surrounds the axis extending from the physical location of the first user in the augmented reality view, such that the second user can see the at least part of the virtual reality space experienced by the first user.

* * * * *